United States Patent

[11] 3,619,044

| [72] | Inventor | Pandurang M. Kamath<br>East Woodstock, Conn. |
|---|---|---|
| [21] | Appl. No. | 12,378 |
| [22] | Filed | Feb. 18, 1970 |
| [45] | Patented | Nov. 9, 1971 |
| [73] | Assignee | American Optical Corporation<br>Southbridge, Mass.<br>Continuation-in-part of application Ser. No. 815,322, Apr. 11, 1969, now Patent No. 3,551,035.<br>The portion of the term of the patent subsequent to Dec. 29, 1987, has been disclaimed. |

[54] RIGID GAS PERMEABLE CONTACT LENS WITH SOFTER EDGE PORTION
2 Claims, 10 Drawing Figs.

[52] U.S. Cl. ................................................ 351/160,
351/177
[51] Int. Cl. .................................................. G02c 7/04
[50] Field of Search ............................................. 351/160

[56] References Cited
UNITED STATES PATENTS

| 3,551,035 | 12/1970 | Kamath ......................... | 351/160 |
| 3,489,491 | 1/1970 | Creighton ..................... | 351/160 |

*Primary Examiner*—David H. Rubin
*Attorneys*—Lane, Aitken, Dunner and Ziems and William C. Nealon ABSTRACT: A rigid, oxygen permeable contact lens formed of the plastic material poly (4-methyl pentene-1) with a soft swellable plastic grafted on the poly (4-methyl pentene-1) lens as the edge of the lens. Method of making such lenses.

INVENTOR
PANDURANG M. KAMATH

SCRAPED WASHED & DRIED

INVENTOR
PANDURANG M. KAMATH 3,619,044

RIGID GAS PERMEABLE CONTACT LENS WITH SOFTER EDGE PORTION

CROSS-REFERENCE TO RELATED APPLICATION

This application is a continuation-in-part of application Ser. No. 815,322, filed Apr. 11, 1969, now U.S. Pat. No. 3,551,035.

BACKGROUND OF THE INVENTION

The field of this invention is plastic materials suitable for use as contact lenses.

It has long been felt in the ophthalmic industry that the most desirable place to effect vision correction is directly on the surface of the eye with a contact lens. However, in spite of the numerous advantages of contact lenses, a large segment of the public has been reluctant to resort to this form of vision correction because of the irritation and discomfort caused by wearing contact lenses.

In the past, many plastic materials have been used in the contact lens field. Of these, the pioneer and most often used material is polymethyl methacrylate. Although this polymer possesses many of the optical properties needed for vision correction serious problems such as irritation and discomfort of the wearer have resulted from its use as a contact lens material. One physical property of notable importance which makes it undesirable as a contact lens material is that it is impermeable to gases.

In connection with the foregoing impermeability property, it is known that much of the irritation due to the use of contact lenses is the result of oxygen starvation of the cornea. Since the cornea has no vascular system, its metabolism is dependent on absorption and secretion processes. With an impermeable material, as is the case with most optical plastics and particularly polymethyl methacrylate, absorption and secretion processes of the cornea are frustrated. Those in the art have long recognized that the solution to the problem lies in the choice of the material. For this reason, the optical industry has engaged in extensive research in an unsuccessful attempt to find suitable new materials or techniques which would make previous materials more suitable.

As an example of such a technique, polymethyl methacrylate contact lenses have been drilled with breathing holes in order to permit the passage of oxygen. This technique, however, has proven entirely unsatisfactory since the optical properties of lenses containing breathing holes is greatly reduced.

The research in this field has generated a great deal of literature, including the issuance of various patents. For example, U.S. Pat. No. 3,228,741 teaches the use of a transparent silicone rubber as an oxygen-permeable material for a contact lens. However, this material does not possess the high optical properties of a rigid plastic such as polymethyl methacrylate. Also, the silicone rubber is soft and tends to cause the contact lens to cling to the cornea making removal of the lens difficult. The clinging properties also tend to distort the corrective curvature formed on the lens.

U.S. Pat. No. 2,976,576 is directed towards a method of preparing a gas permeable polymeric material. However, the material, as taught in that patent, also is soft and tends to cling to the cornea.

In connection with such soft lens materials, many in the art thought that a soft plastic material would be desirable since it was believed that the irritation due to continued use of contact lenses was the result of the difference in softness between the cornea and other parts of the eye and the harder material of the lens itself. Although the difference in softness between parts of the cornea and the contact lens material contributes somewhat to the discomfort and irritation problem, this factor is not controlling. The results of numerous tests and experiments have indicated that the most critical factor in a contact lens as far as irritation and discomfort of the wearer is concerned is the fluid permeability of the lens. In this regard, contact lens materials such as those disclosed in the above patents have been suggested which permit the passage of gases, notably, oxygen and carbon dioxide. However, all of the materials suggested up to the present are soft and, due to lack of rigidity, do not hold their shape when worn continuously. Soft plastic contact lenses tend to cling to and take the configuration of the cornea rather than maintain the corrective configuration applied thereon. In addition to distorting the corrective curvature applied to the lens, the clinging properties of the soft plastic tends to make wearing of the lens more irritating and also tends to cause a buildup of water vapor between the cornea and the lens which ultimately results in reduction of the wearer's vision.

SUMMARY OF THE INVENTION

In accordance with the present invention a rigid gas-permeable contact lens is provided. The lens is formed of the polymer poly(4-methyl pentene-1) which not only maintains the corrective curvature applied on the surfaces of the lens but also allows the passage of gas through the lens.

In order to reduce the effects of the hardness of the lens, a soft swellable plastic is grafted on the poly (4-methyl pentene-1) lens as the edge of the lens which contacts the cornea.

Accordingly, it is a primary object of the present invention to provide a contact lens which can be worn without discomfort and irritation.

It is another object of the present invention to provide a contact lens which is both rigid and gas-permeable with a soft portion which contacts the cornea when worn.

It is a further object of the invention to provide a lens with a soft edge, which lens is of high optical quality and which can be easily machined or molded into the proper configuration.

DESCRIPTION OF THE PREFERRED EMBODIMENTS

The present invention comprises an improved contact lens for an eye employing a rigid, gas-permeable polymer. In accordance with the present invention it has been discovered that optimizing the optical properties of contact lenses is a matter of a control of the rigidity of the lens—the more rigid the material used in forming the lens, the more desirable will be its optical properties. However, in addition to being rigid, the material must also allow the passage of gases.

Figure 1:
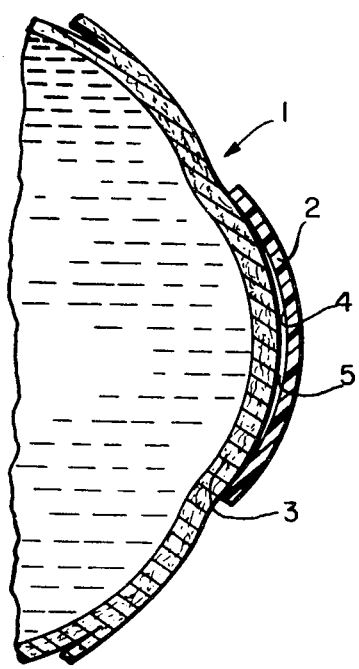
FIG. 1 is a vertical cross-sectional view of a human eye with a soft prior art plastic contact lens applied to the cornea.
Figure 2:
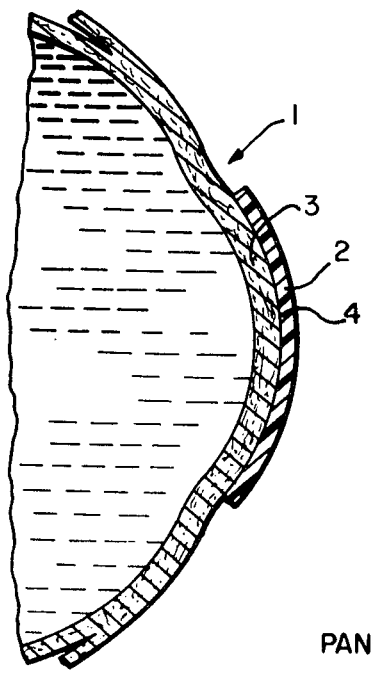
FIG. 2 is a similar view to FIG. 1 showing distortion of the corrective curvature due to the lens clinging to and taking the configuration of the cornea.

As an illustration of the desirability of rigid lenses, FIG. 1 of the drawing shows human eye 1 having a prior art soft material corneal-type contact lens 2 in place over cornea 3. Although contact lenses are generally shaped to take the configuration of the cornea, the fit may not be exact and there is usually a void indicated in FIG. 1 by reference numeral 5 between inside 4 of lens 2 and cornea 3. As is shown in FIG. 2, after continued use of a soft material contact lens, void 5 has disappeared and inside surface 4 of contact lens 2 is in direct contact with cornea 3. Thus, the desired configuration of the lens which includes the corrective curvature is distorted. Furthermore, the close proximity of the soft plastic lens with the cornea contributes to forming a liquid film consisting mainly of water. This film not only destroys the optical clarity of the lens but also acts as a shield preventing the absorption and secretion processes.

Since the invention is a lens, it is not enough that the material be rigid and fluid permeable. The material must also be transparent to visible light and must have physical properties of a nature that permits lenses to be easily made.

Thus, in accordance with the present invention, four factors are considered in the choice of a plastic material for a contact lens. These are:
1. The plastic must be clear;
2. The material must be permeable to gases and permit the passage of oxygen and carbon dioxide;
3. The material must be machinable or moldable so that the lenses can be formed and the corrective curvature applied thereon; and
4. The material must be rigid enough to maintain the corrective curvature formed thereon during continued use by the wearer.

The optical industry has never recognized that all these four factors are critical and must be satisfied in order to provide a truly acceptable contact lens.

For this reason, the contact lens of the present invention is formed of a polymer which is new to the contact lens art.

The material employed in the contact lens of the instant invention is poly (4-methyl pentene-1) which has the formula

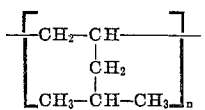

and has an average molecular weight of approximately 10,000. The material is available commercially in the form of pellets sold under the trade name TPX by Imperial Chemical Industry: America and can be purchased at the following address:

I.C.I.
151 South Street
Stamford Connecticut 06904

In the preferred embodiment TPX has an average molecular weight of approximately 10,000. However, a polymer having the formula

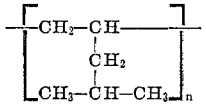

with a molecular weight between the range of 5,000 to 50,000 will provide improved results when used to form a contact lens.

Figure 3:
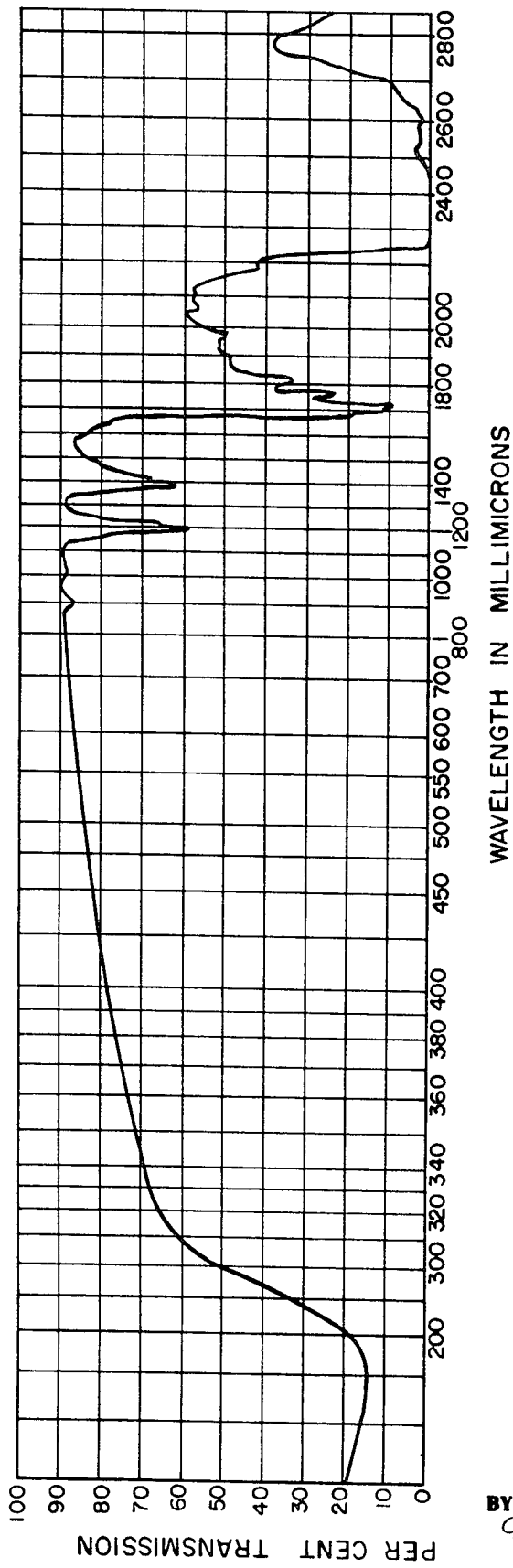
FIG. 3 is a graph showing the percent transmission versus wavelength in millimicrons of the polymer poly(4-methyl pentene-1)
Figure 4:
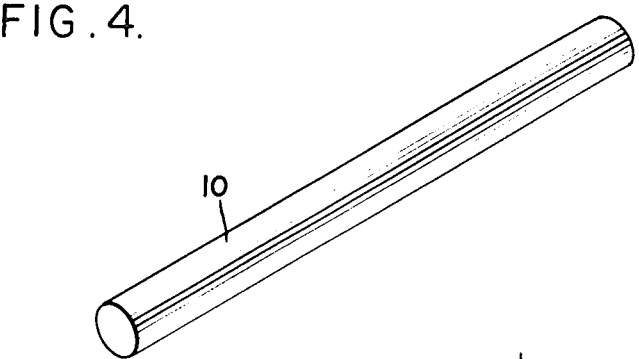
FIG. 4 is a perspective view of the rod formed of the polymer poly (4-methyl pentene-1)
Figure 5:
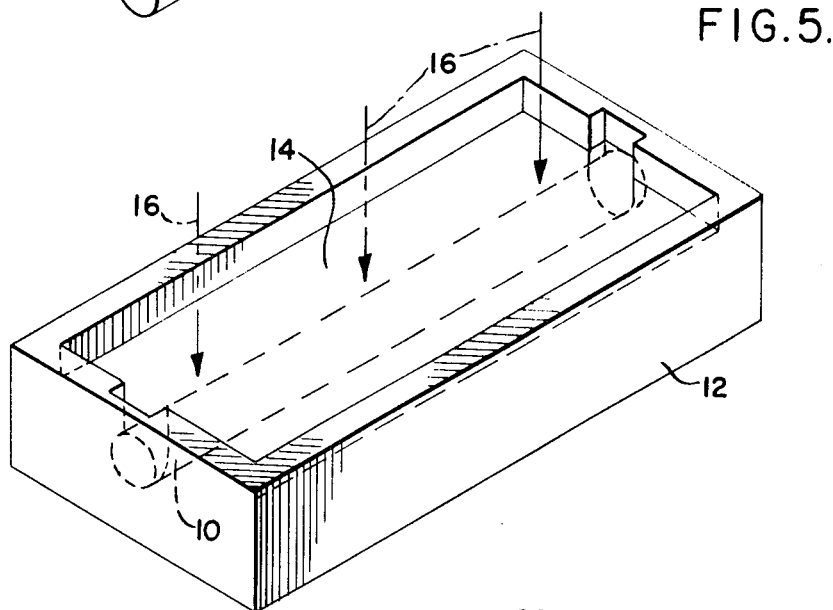
FIG. 5 is a perspective view of the apparatus for grafting a polymer cladding on the rod of FIG. 4.
Figure 6:
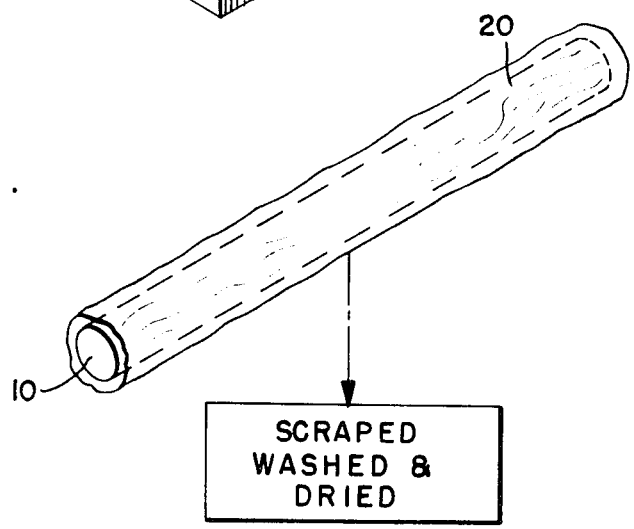
FIG. 6 is a perspective view of the rod of FIG. 4 after having a polymer grafted thereon as a cladding.
Figure 7:
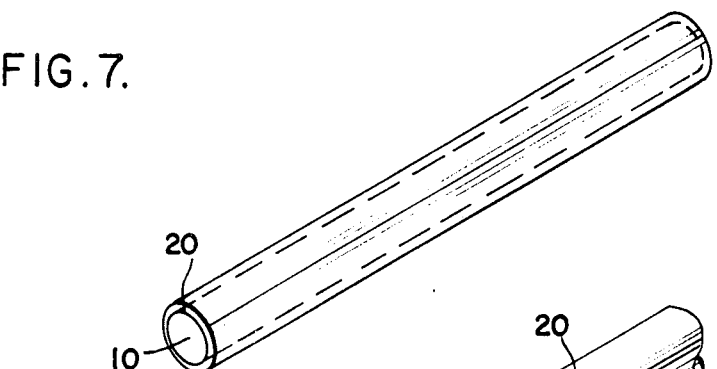
FIG. 7 is a perspective view of the rod of FIG. 6 after being scraped, washed and dried.
Figure 8:
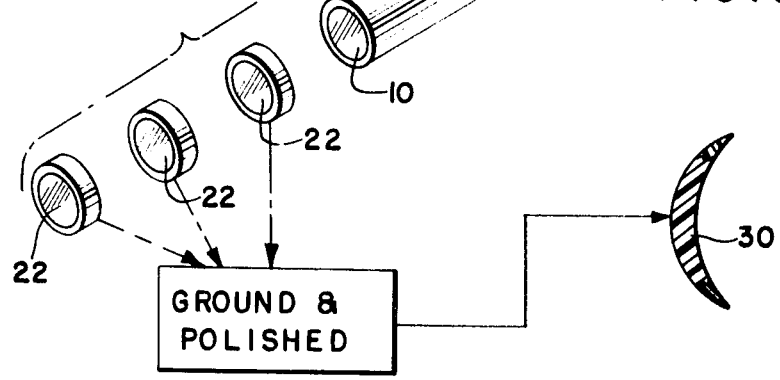
FIG. 8 is a diagrammatic view showing a lens formed from discs cut from the rod of FIG. 7.
Figure 9:
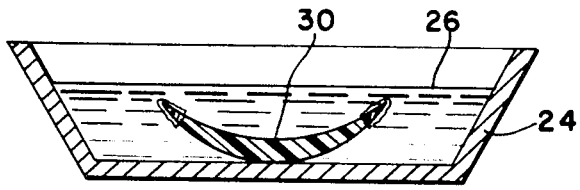
FIG. 9 is a sectional view showing the lens of FIG. 8 being treated in order to swell the edge of the lens.
Figure 10:
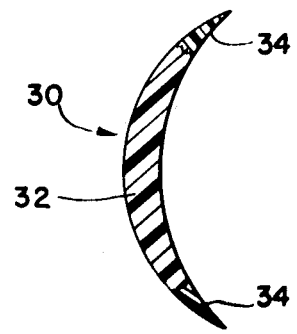
FIG. 10 is a sectional view showing the contact lens of the present invention.

FIG. 3 represents a graph supplied by the manufacturer which further identifies the polymer poly (4-methyl pentene-1) as sold under the trade name TPX. The graph shows the percent of optical transmission versus wavelength in millimicrons of the polymer employed to form lenses in accordance with the invention.

Since the polymer poly (4-methyl pentene-1) is available in pellet form, conventional lens forming methods may be employed to form the rigid portion of the lens of the present invention. For example, the pellets may be heated to form rods and the resulting rods cut into discs from which the rigid portion of the lenses can be machined. The pellets may also be introduced directly into a mold and heated to form the rigid portion. A third possibility is to form a sheet of plastic material from the pellets by heating the pellets and pressing the warm soft pellets into a sheet. The rigid portion of the lens may then be cut directly from the resulting sheet.

Presently, commercial manufacturers employ two fabrication techniques in order to fabricate contact lenses from convention materials such as polymethyl methacrylate. The two techniques are machine turning and direct molding. As was stated above, successful results have been obtained utilizing both of these procedures with the polymer of the instant invention to form the rigid portion of the lens.

In the machine turning process, a clear cylindrical plug of poly (4-methyl pentene-1) having dimensions of ¼ inch thickness and ½ inch diameter was first molded by using a small one oz. capacity injection press. With this plug as starting stock, a spherical corrective surface was applied on each side. The cutting tool used was a precision radius cutting lathe and a concave surface was turned on one side of the plug with a convex surface turned on the opposite side. The resulting lens blank was then cut to contact lens size, polished and finished using equipment and procedures employed for carrying out similar operations on a methacrylate contact lens.

Direct molding fabrication was also successfully employed with the polymer of the invention. The procedure followed consisted of placing approximately two hundred milligrams of poly (4-methyl pentene-1) between two heated mold surfaces, a convex surface and a concave surface. Each surface was attached to a platen of a compression press and after the polymer had softened by the application of heat, the mold surfaces were urged together until a lens was formed. In this procedure the resulting lens blank has polished corrective surfaces due to the highly polished surface of the mold itself. The resulting lens blank was then cut to the required size and the edges finished and polished.

The rigid portion of the lens of the present invention resulting from any of the foregoing processes is not specifically shown in a figure of the drawing since it is identical in outward appearance to the lens shown in FIG. 1.

The rigid portion of lenses fabricated according to the invention were tested for oxygen permeability and the result of the test compared with the polymethyl methacrylate lenses and is given in the table below:

OXYGEN PERMEABILITY OF POLYMER

| Polymer | Permeability $P \times 10^{12}$ (cc. cm./cm.$^2$ sec. cm. Hg) |
| --- | --- |
| Poly-methyl methacrylate | 10.2 |
| Poly (4-methyl pentene-1) | 6500. |

Clinical tests were conducted with rabbits. In the tests, the rabbits wore a conventional polymethyl methacrylate lens on one eye and a lens formed of poly (4-methyl pentene-1) on the other eye for a two week period. Daily examination of the eyes of the rabbits during the test period showed that the lenses moved freely in both eyes during blinking indicating that neither lens showed a tendency to cling. However, at the end of the test period, the eyes which wore polymethyl methacrylate lenses exhibited varying degrees of corneal damage caused by oxygen deprivation. Those eyes which wore the lens formed of the poly (4-methyl pentene-1) exhibited practically no damage. The tests were conducted by the well known fluorescein staining technique.

The results of the foregoing tests provided convincing evidence that a rigid gas permeable contact lens significantly reduces the discomfort and irritation problems normally associated with contact lenses.

It has also been found that the hardness factor, a factor not as significant as the gas permeability factor, contributes to a lesser degree toward irritation and discomfort.

In accordance with the present invention a rim of a soft plastic material is applied to the rigid portion of the lens in order to reduce the hardness of the rigid portion. The rim or soft edge is applied to the lens so that the soft edge is in contact with the cornea when the lens is worn. Accordingly, the broad concept of the invention involves the application of a plastic or polymer material which is softer than the polymer poly (4-methyl pentene-1) as the edge of a lens formed of poly (4-methyl pentene-1).

In one important embodiment of the invention in order to accomplish the application of a soft plastic edge to the harder poly (4-methyl pentene-1) polymer lens, the lens was treated by grafting a polymer of polyacrylic acid to the lens. So that the grafted polyacrylic acid polymer would act as a pillow or cushion between the cornea and the lens, the grafted acrylic acid polymer was further treated by being contacted with water causing the polyacrylic acid graft to swell and soften.

Since the foregoing soft edge is a graft polymer it is impossible to identify the average molecular weight by the conventional method of viscosity measurements. Furthermore, the molecular weight range of the polyacrylic acid edge is not critical. In order to accomplish the objects of the present invention utilizing a polyacrylic acid polymer as the soft edge it is critical that the grafted edge be hydrophilic. When such acrylic acid polymers are hydrophilic, they are softer than the polymer poly (4-methyl pentene-1).

Accordingly, all the known molecular weights for polyacrylic acid polymers are usable so long as such polymers are hydrophilic. To render such grafted polymers hydrophilic, proper polymerization catalysts are employed. In the preferred polymerization procedure the grafting is carried out with gamma radiation from a cobalt[60] source.

The process of grafting a soft edge of a polyacrylic acid polymer is shown in FIGS. 4 through 10 of the drawing. The process starts by providing a rod 10 of the material poly (4-methyl pentene-1). Rod 10 may be formed by heating poly (4-methyl pentene-1) pellets as described above. Rod 10 is submerged in a vessel 12 containing an aqueous solution 14 of acrylic acid and a homopolymerization inhibitor. Operative results occur when the aqueous solution contains 20-80 weight percent acrylic acid. The inhibitor is preferably ferrous sulfate within the range of 0.5-2 weight percent of the solution. While the rod is submerged in aqueous solution 14, it is subjected to gamma radiation 16 from a source of gamma radiation such as cobalt[60] until a total radiation dose of approximately 5-15 megarads is absorbed.

After treatment as described above, the rod becomes grafted with a swollen polyacrylic acid polymer cladding 20 on the entire outside surface. The rod is removed from vessel 12 and scraped to remove the excess soft polyacrylic acid gel and provide a cladding of said gel of uniform thickness. Thereafter, the gel clad rod is washed in isopropyl alcohol or other water immiscible organic solvents such as kerosene and turpentine until all traces of acrylic acid and soluble polymer are removed. The rod is then allowed to dry in air. From rod 10 buttons 22 of roughly 2 to 3 millimeters thickness are cut. Using buttons 22 as starting stock, spherical corrective surfaces are applied on each side to from a lens 30 in the same manner which is conventional for applying such surface to polymethyl methacrylate lenses with one exception. During the process no water is allowed to come in contact with the lens. Where water would normally be employed, that is, for washing away ground plastic, isopropyl alcohol or water immiscible organic solvents such as kerosene or turpentine are used. After lens 30 is ground and polished, it is placed in vessel 24 containing water 26 for 30-60 minutes. The lens is then removed from vessel 24. Upon removal, lens 30 has a rigid optical center area 32 and a soft edge 34.

The following is an example illustrating the preparation of such a lens with a soft edge. A poly (4-methyl pentene-1) rod with dimensions of 9 millimeters in diameter and 5 centimeters long was immersed in a vessel containing a 50% by weight aqueous solution of acrylic acid, $H_2C:CHCOOH$ containing 1% by weight ferrous sulfate. The ferrous sulfate acted as a polymerization inhibitor. The vessel containing the rod was placed in a gamma radiation field until a dose of approximately 10 megarads was absorbed. As a result of this treatment the rod was grafted with a swellable polyacrylic acid polymer on the entire outside surface. The penetration of the swellable polyacrylic acid polymer was approximately ½ millimeter deep. The grafted rod was then scraped gently to remove excess polyacrylic acid gel. The scraping was performed so as to yield a uniform depth of ½ millimeter of soft polymer. The rod was then washed with isopropyl alcohol until free of traces of acrylic acid and soluble polymer. The rod was thereafter allowed to dry in air for about 24 hours. From this rod buttons of approximately 2-3 millimeters thickness were cut and lenses fabricated using these buttons as the stock in the same manner as performed with the lenses formed from buttons of polymethyl methacrylate with the exception that no water was allowed to come in contact with the lens at any time during polishing, edging and final finishing. Wherever water would normally be employed in such a lens forming operation, isopropyl alcohol was employed. After completion of the finished lens, it was soaked in water for 45 minutes which swelled the polyacrylic acid graft yielding a soft edge of approximately 1 millimeter in width.

Accordingly, by providing a contact lens of poly (4-methyl pentene-1) with a soft edge in accordance with this invention, oxygen starvation of the cornea is greatly reduced while at the same time providing a material which is rigid enough so as not to cling to the eye of the wearer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A rigid, gas permeable, contact lens of concavo-convex form in section, with the concave surface substantially conforming to the cornea of the eye, said lens being formed of the polymer poly (4-methyl pentene-1), said polymer having an oxygen permeability of about 6,500 as measured in permeability units of $P \times 10^{12}$ (cc. cm./cm.$^2$ sec. cm. Hg), said lens having an edge of a plastic material which is softer than said polymer poly (4-methyl pentene-1).

2. A rigid, gas permeable, contact lens of concavo-convex form in section, with the concave surface substantially conforming to the cornea of the eye, with a soft edge, said lens being formed of the polymer poly (4-methyl pentene-1) said polymer having an oxygen permeability of about 6,500 as measured in permeability units of $P \times 10^{12}$ (cc. cm/cm.$^2$ sec. cm. Hg) and said edge being a hydrophilic polyacrylic acid polymer.

* * * * *